US011625855B2

(12) United States Patent
Kim et al.

(10) Patent No.: US 11,625,855 B2
(45) Date of Patent: Apr. 11, 2023

(54) METHOD AND SYSTEM FOR UPDATING MAP FOR POSE ESTIMATION BASED ON IMAGES

(71) Applicant: NAVER LABS CORPORATION, Seongnam-si (KR)

(72) Inventors: Deokhwa Kim, Seongnam-si (KR); Donghwan Lee, Seongnam-si (KR); Sangok Seok, Seongnam-si (KR)

(73) Assignee: NAVER LABS CORPORATION, Seongnam-si (KR)

(*) Notice: Subject to any disclaimer, the term of this patent is extended or adjusted under 35 U.S.C. 154(b) by 210 days.

(21) Appl. No.: 16/841,920

(22) Filed: Apr. 7, 2020

(65) Prior Publication Data

US 2020/0320738 A1   Oct. 8, 2020

(30) Foreign Application Priority Data

Apr. 8, 2019 (KR) .................. 10-2019-0040936

(51) Int. Cl.
*G06T 7/73* (2017.01)
*G06F 16/29* (2019.01)
*G06F 16/587* (2019.01)
*G06F 16/901* (2019.01)
*G06F 16/583* (2019.01)
(Continued)

(52) U.S. Cl.
CPC ................ *G06T 7/74* (2017.01); *G01C 21/32* (2013.01); *G06F 16/29* (2019.01); *G06F 16/532* (2019.01); *G06F 16/587* (2019.01); *G06F 16/5854* (2019.01); *G06F 16/9024* (2019.01); *G06T 2207/20072* (2013.01)

(58) Field of Classification Search
CPC ............ G06T 7/74; G06T 2207/20072; G06T 2207/30241; G06T 2207/30244; G06T 7/579; G01C 21/32; G01C 21/3848; G06F 16/29; G06F 16/532; G06F 16/5854; G06F 16/587; G06F 16/9024; G09B 29/003
See application file for complete search history.

(56) References Cited

U.S. PATENT DOCUMENTS 8,055,382 B2 * 11/2011 Myeong ............... G05D 1/0274
700/250
2012/0121161 A1 * 5/2012 Eade .................... G05D 1/0253
901/1
(Continued)

FOREIGN PATENT DOCUMENTS

KR   1020100070922 A   6/2010
KR   1020140014298 A   2/2014
(Continued)

OTHER PUBLICATIONS

Korean Office Action dated Jun. 18, 2020 by the Korean Patent Office corresponding to Korean patent application No. 10-2019-0040936.

*Primary Examiner* — Ashish Thomas
*Assistant Examiner* — Yohanes D Kelemework
(74) *Attorney, Agent, or Firm* — Greer Burns & Crain Ltd.

(57) ABSTRACT

A map updating method may include calculating a relative pose relationship between consecutive images; calculating an absolute pose of each image based on the relative pose relationship between the consecutive images; and updating a map used for visual localization (VL) based on the absolute pose.

11 Claims, 11 Drawing Sheets

(51) Int. Cl.
    *G01C 21/32*     (2006.01)
    *G06F 16/532*     (2019.01)

(56) References Cited

U.S. PATENT DOCUMENTS

2020/0240793 A1*   7/2020   Li ......................... G01C 21/32
2020/0300637 A1*   9/2020   Chiu ................... G05D 1/0291

FOREIGN PATENT DOCUMENTS

| KR | 1020150124372 A | 11/2015 |
|----|-----------------|---------|
| KR | 1020180123558 A | 11/2018 |

* cited by examiner

METHOD AND SYSTEM FOR UPDATING MAP FOR POSE ESTIMATION BASED ON IMAGES

CROSS-REFERENCE TO RELATED APPLICATION(S)

This U.S. non-provisional application claims the benefit of priority under 35 U.S.C. § 119 to Korean Patent Application No. 10-2019-0040936 filed on Apr. 8, 2019, in the Korean Intellectual Property Office (KIPO), the entire contents of which are incorporated herein by reference.

BACKGROUND OF THE INVENTION

Field of Invention

One or more example embodiments of the following description relate to technology for updating a map for a pose estimation of a mobile device.

Description of Related Art

A mobile robot needs to verify its position in a given environment and also needs to generate a map about a peripheral environment if the mobile robot is provided in a previously unexperienced new environment.

A map generation of the mobile robot refers to a task of verifying positions of obstacles or objects around the mobile robot and an open space where the mobile robot may freely move and memorizing the positions and the open space in an appropriate manner.

As an example of map generation technology of a mobile robot, Korean Patent Laid-Open Publication No. 10-2010-0070922 (published on Jun. 28, 2010) describes technology that may generate a grid map based on distance information from a peripheral object and then generate a final grid map for recognizing a position of a mobile robot through an interaction between the grid map and position information of a landmark.

BRIEF SUMMARY OF THE INVENTION

One or more example embodiments provide a method and system that may update a map for visual localization (VL) (referred to as a VL map) to verify a position of a mobile device based on images.

One or more example embodiments also provide a method and system that may update a map by applying a change in a space and a state.

One or more example embodiments also provide a method and system that may update a VL map based on consecutive query information generated to use a location based service in a target space.

According to an aspect of at least one example embodiment, there is provided a map update method executed by a computer system including at least one processor configured to execute computer-readable instructions included in a memory, the method including: by the at least one processor, calculating a relative pose relationship between consecutive images; calculating an absolute pose of each image based on the relative pose relationship between the consecutive images; and updating a map used for visual localization (VL) based on the absolute pose.

The calculating of the relative pose relationship may include receiving the consecutive images from an electronic device as query information generated in the electronic device using a VL based service.

The calculating of the relative pose relationship may include calculating the relative pose relationship between the consecutive images using correspondences of features extracted from the respective images.

The calculating of the absolute pose may include determining whether the calculation of the absolute pose of each image is a failure through VL using the map; and estimating an absolute pose of a remaining image corresponding to a calculation failure using an absolute pose of an image corresponding to a calculation success among the consecutive images and the relative pose relationship between the consecutive images.

The estimating of the absolute pose of the remaining image may include estimating the absolute pose of the remaining image corresponding to the calculation failure through a graph structure that is defined based on the absolute pose of the image corresponding to the calculation success and the relative pose relationship between the consecutive images.

The estimating of the absolute pose of the remaining image may include generating a graph structure in which a pose of each image is defined as a node and a pose difference between images is defined as an edge with respect to the consecutive images; defining the absolute pose of the image corresponding to the calculation success among the consecutive images as an additional node in the graph structure; and estimating an absolute pose of an image corresponding to a remaining node using a method of minimizing an error between the node and the additional node.

The determining whether the calculation of the absolute pose of each image is a failure may include extracting a feature of a query image corresponding to each image; retrieving a reference image similar to the query image using the feature; and estimating an absolute pose on the map through a localization using the query image and the reference image.

The updating of the map may include adding an image of which an absolute pose is estimated among the consecutive images as a reference image for VL.

According to another aspect of at least one example embodiment, there is provided a non-transitory computer-readable record medium storing computer instructions that, when executed by a processor, cause the processor to perform the map updating method described above.

According to another aspect of at least one example embodiment, there is provided a computer system including at least one processor configured to execute computer-readable instructions included in a memory. The at least one processor includes a relative pose calculator configured to calculate a relative pose relationship between consecutive images; an absolute pose calculator configured to calculate an absolute pose of each image based on the relative pose relationship between the consecutive images; and a map updater configured to update a map used for VL based on the absolute pose.

According to some example embodiments, it is possible to update a map for VL to verify a position of a mobile device based on images.

Also, according to some example embodiments, it is possible to update a map by applying a change in a space and a state.

Also, according to some example embodiments, it is possible to update a VL map based on consecutive query information generated to use a location based service in a target space.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein.

Figure 1:
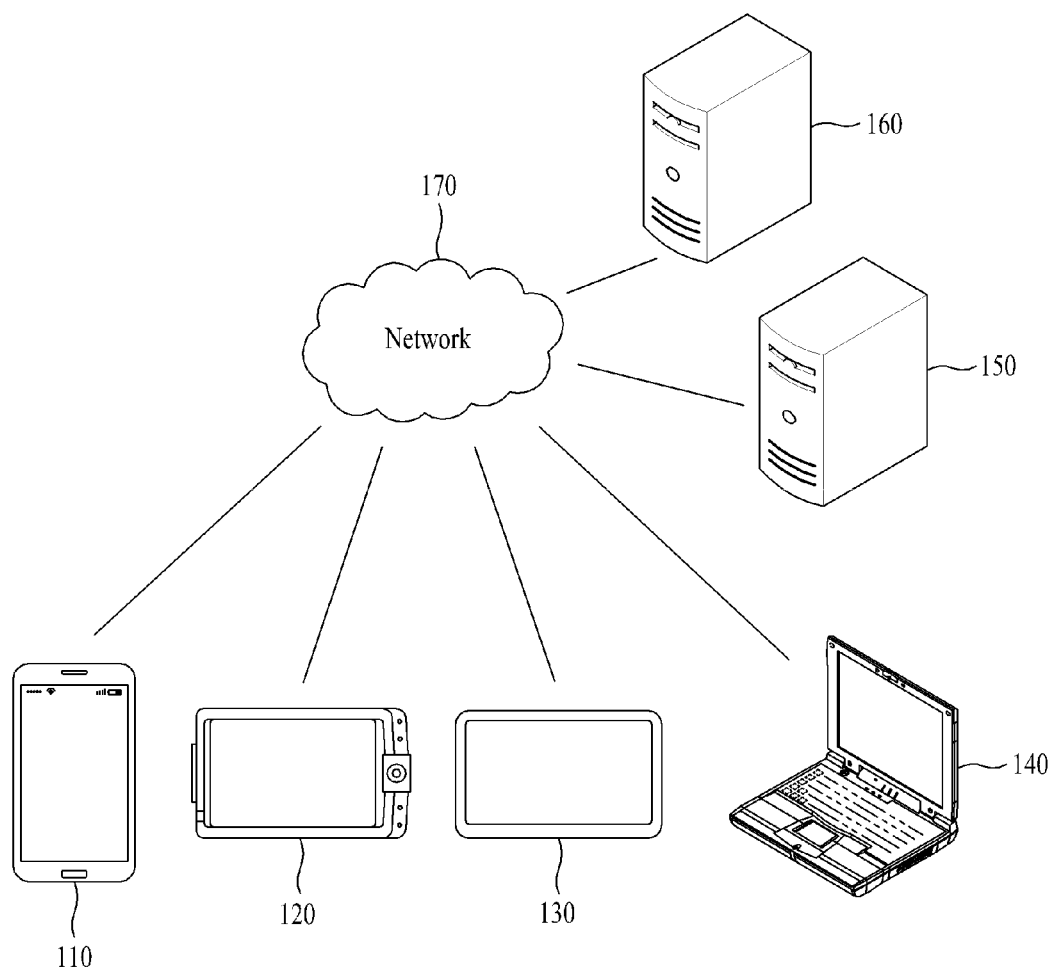
FIG. 1 illustrates an example of a network environment according to an example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION OF THE INVENTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable storage mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments of the present invention will be described with reference to the accompanying drawings.

Example embodiments relate to technology for maintaining a map up to date, that is, updating the map for a pose estimation of a mobile device. Pose estimation generally refers to a technical field that provides posture information of a moving object. In the present invention, it refers to calculation of poses corresponding to a query image (including a 3-axis position value and a 3-axis direction value), that is, pose calculation.

The example embodiments including disclosures herein may update a map for visual location (VL) (referred to as a VL map) based on images and, accordingly, may achieve many advantages in terms of update, efficiency, robustness, permanence, cost saving, and the like.

FIG. 1 is a diagram illustrating an example of a network environment according to an example embodiment. Referring to FIG. 1, the network environment includes a plurality of electronic devices 110, 120, 130, 140, a plurality of servers 150, 160, and a network 170. FIG. 1 is provided as an example only and thus, a number of electronic devices and/or a number of servers are not limited thereto.

Each of the plurality of electronic devices 110, 120, 130, 140 may be a fixed terminal or a mobile terminal configured as a computer system. For example, the plurality of electronic devices 110, 120, 130, 140 may be a smartphone, a mobile phone, a navigation, a computer, a laptop computer, a digital broadcasting terminal, a personal digital assistant (PDA), a portable multimedia player (PMP), a tablet personal computer (PC), a game console, a wearable device, an Internet of things (IoT) device, a virtual reality (VR) device, an augmented reality (AR) device, and the like. For example, although FIG. 1 illustrates a shape of a smartphone as an example of the electronic device 110, the electronic device 110 may refer to one of various physical computer systems capable of communicating with other electronic devices 120, 130, 140, and/or the servers 150, 160 over the network 170 in a wired communication manner or in a wireless communication manner.

The communication scheme is not particularly limited and may include a communication method using a near field communication between devices as well as a communication method using a communication network, for example, a mobile communication network, the wired Internet, the wireless Internet, a broadcasting network, a satellite, etc., which may be included in the network 170. For example, the network 170 may include at least one of network topologies that include, for example, a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, these are only examples and the example embodiments are not limited thereto.

Each of the servers 150, 160 may be configured as a computer apparatus or a plurality of computer apparatuses that provides instructions, codes, files, contents, services, and the like through communication with the plurality of electronic devices 110, 120, 130, 140 over the network 170. For example, the server 150 may be a system that provides a first service to the plurality of electronic devices 110, 120, 130, 140 connected over the network 170, and the server 160 may be a system that provides a second service to the plurality of electronic devices 110, 120, 130, 140 connected over the network 170. In detail, the server 150 may provide a service, for example, a VL-based service, of a corresponding application as the first service through the application as a computer program installed and executed on the plurality of electronic devices 110, 120, 130, 140. As another example, the server 160 may provide a service for distributing a file for installing and executing the application to the plurality of electronic devices 110, 120, 130, 140 as the second service.

Figure 2:
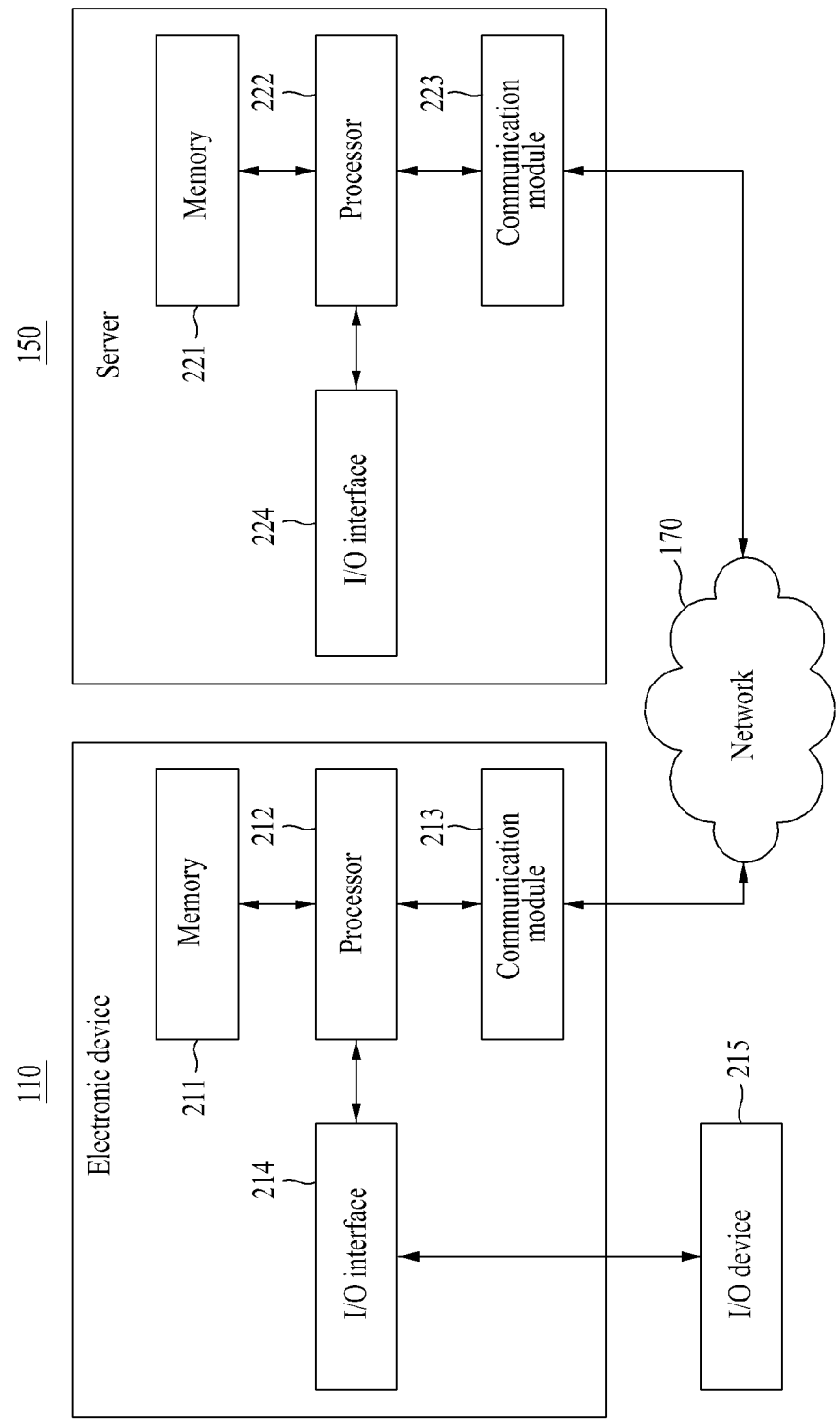
FIG. 2 illustrates an example of an electronic device and a server according to an example embodiment.

FIG. 2 is a block diagram illustrating an example of a configuration of an electronic device and a server according to an example embodiment. FIG. 2 illustrates a configuration of the electronic device 110 as an example for a single electronic device and illustrates a configuration of the server 150 as an example for a single server. The same or similar components may be applicable to other electronic devices 120, 130, 140, or the server 160, and also to still other electronic devices or still other servers.

Referring to FIG. 2, the electronic device 110 may include a memory 211, a processor 212, a communication module 213, and an input/output (I/O) interface 214, and the server 150 may include a memory 221, a processor 222, a communication module 223, and an I/O interface 224. The memory 211, 221 may include a permanent mass storage device, such as random access memory (RAM), a read only memory (ROM), a disk drive, a solid state drive (SSD), and a flash memory, as a non-transitory computer-readable storage medium. The permanent mass storage device, such as ROM, SSD, a flash memory, and a disk drive, may be included in the electronic device 110 or the server 150 as a permanent storage device separate from the memory 211, 221. Also, an OS or at least one program code, for example, a code for a browser installed and executed on the electronic device 110 or an application installed and executed on the electronic device 110 to provide a specific service, may be stored in the memory 211, 221. Such software components may be loaded from another non-transitory computer-readable storage medium separate from the memory 211, 221. The other non-transitory computer-readable storage medium may include a non-transitory computer-readable storage medium, for example, a floppy drive, a disk, a tape, a DVD/CD-ROM drive, a memory card, etc. According to other example embodiments, software components may be loaded to the memory 211, 221 through the communication module 213, 223, instead of, or in addition to, the non-transitory computer-readable storage medium. For example, at least one program may be loaded to the memory 211, 221, for example, an application, installed by files provided over the network 170 from developers or a file distribution system, for example, the server 160, which provides an installation file of the application.

The processor 212, 222 may be configured to process computer-readable instructions of a computer program by performing basic arithmetic operations, logic operations, and I/O operations. The computer-readable instructions may be provided from the memory 211, 221 or the communication module 213, 223 to the processor 212, 222. For example, the processor 212, 222 may be configured to execute received instructions in response to the program code stored in the storage device, such as the memory 211, 221.

The communication module 213, 223 may provide a function for communication between the electronic device 110 and the server 150 over the network 170, and may provide a function for communication with another electronic device, for example, the electronic device 120, or another server, for example, the server 160. For example, the processor 212 of the electronic device 110 may transfer a request created based on a program code stored in the storage device, such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, content, a file, etc., of the server 150 received through the communication module 213 may be transferred to the processor 212 or the memory 211, and content, a file, etc., may be stored in a storage medium, for example, the permanent storage device, further includable in the electronic device 110.

The I/O interface 214 may be a device used for interface with an I/O device 215. For example, an input device of the I/O device 215 may include a device, such as a keyboard, a mouse, a microphone, and a camera, and an output device of the I/O device 215 may include a device, such as a display, a speaker, and a haptic feedback device. As another example, the I/O interface 214 may be a device for interface with an apparatus in which an input function and an output function are integrated into a single function, such as a touchscreen. The I/O device 215 may be configured as a single device with the electronic device 110. Also, the I/O interface 224 of the server 150 may be a device for interface with an apparatus (not shown) for input or output that may be connected to the server 150 or included in the server 150. In detail, when the processor 212 of the electronic device 110 processes an instruction of the computer program loaded to the memory 211, content or a service screen configured using data provided from the server 150 or the electronic device 120 may be displayed on a display through the I/O interface 214.

According to other example embodiments, the electronic device 110 and the server 150 may include a number of components greater or less than the number of components shown in FIG. 2. However, there is no need to clearly illustrate many components according to the related art. For example, the electronic device 110 may include at least a portion of the I/O device 215, or may further include other components, for example, a transceiver, a global positioning system (GPS) module, a camera, a variety of sensors, a database (DB), and the like. In detail, if the electronic device 110 is a smartphone, the electronic device 110 may be configured to further include a variety of components, for example, an accelerometer sensor, a gyro sensor, a camera module, various physical buttons, a button using a touch panel, an I/O port, a vibrator for vibration, etc., which are generally included in the smartphone.

Hereinafter, a process of calculating a pose (including three-axial position values and three-axial orientation values) based on images, that is, a process of performing a VL is described.

Figure 3:
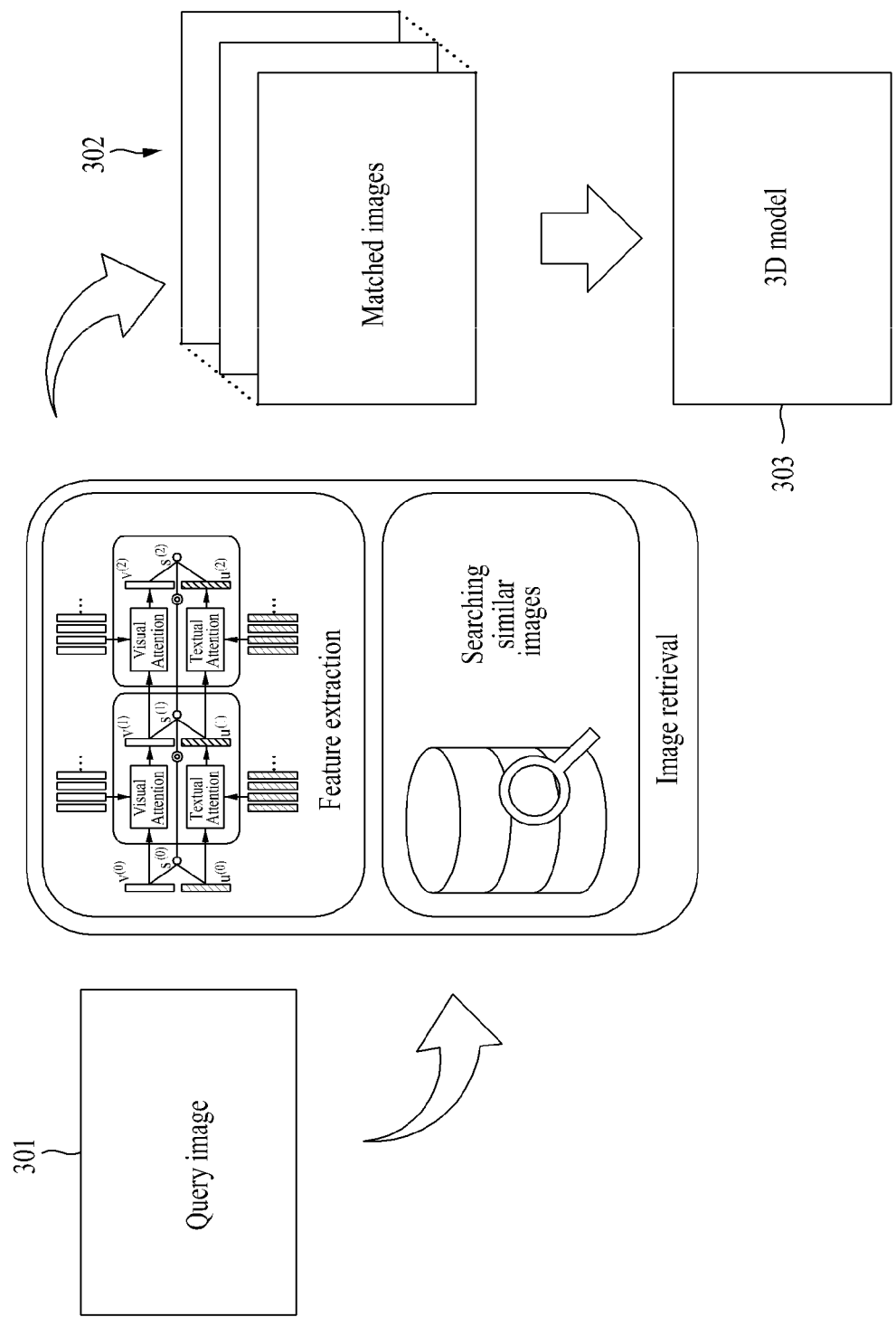
FIGS. 3 and 4 illustrate examples of a process of performing a visual localization (VL) according to an example embodiment.
Figure 4:
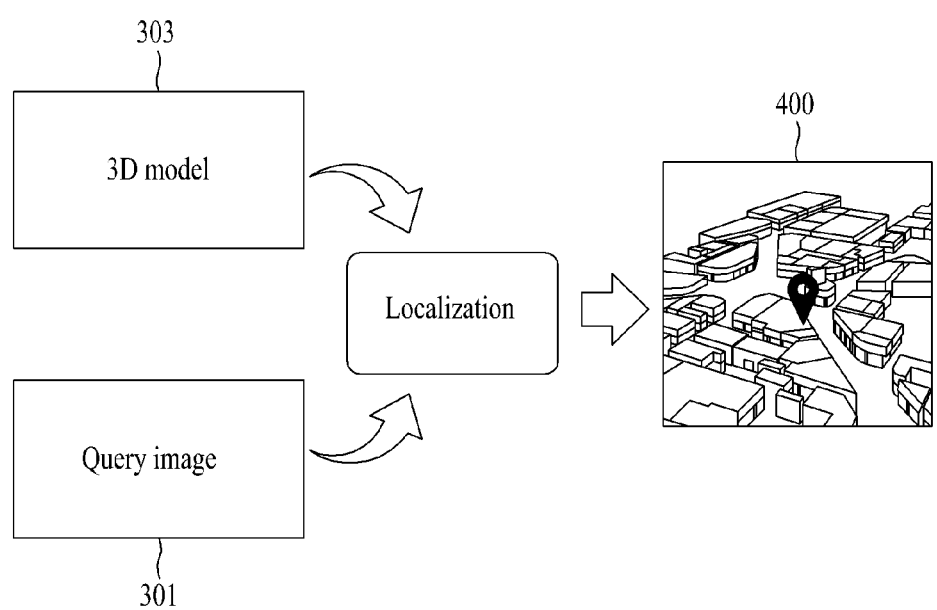

FIGS. 3 and 4 illustrate examples of a VL process according to an example embodiment.

The server 150 may preconfigure and maintain a VL map 400 corresponding to a three-dimensional (3D) model 303 using geographically tagged images for a target space.

Referring to FIG. 3, in response to receiving an image captured by the electronic device 110, for example, a mobile terminal or a mobile robot, as a query image 301, the server 150 may extract a reference image 302 similar to the query image 301 from a VL map database, for example, the memory 221. Here, the server 150 may extract a global picture from the query image 301 through a deep learning model and may retrieve the reference image 302.

Referring to FIG. 4, the server 150 may estimate 6 degree of freedom (DoF) pose (a position and an orientation) of the query image 301 through a localization using the query image 301 and the 3D model 303 corresponding to the reference image 302. That is, the server 150 may perform a VL using pose-tagged data and may verify a point corresponding to the query image 301 on the VL map 400.

As described above, to calculate a pose (including 3-axial position values and 3-axial orientation values) based on images, that is, to perform VL, the server 150 may generate the VL map 400 by scanning a target space using data collection equipment and then processing data, for example, pose-tagged data, acquired through scanning.

However, a change, for example, a disappearance or a new appearance of a shop, a sculpture, a structure, and the like, may occur in the target space over time. The change may affect the performance of VL that operates based on time information only.

Accordingly, there is a need for technology that may update a map by applying a change in a space and a state.

Example embodiments relate to technology for maintaining a VL map up to date, that is, updating the VL map based on sensor information that is consecutive query information generated in the electronic device 110 of the user such that the user may continuously use a location based service in a target space.

Hereinafter, examples of a method and system for updating a map for a pose estimation based on images according to example embodiments are described.

Figure 5:
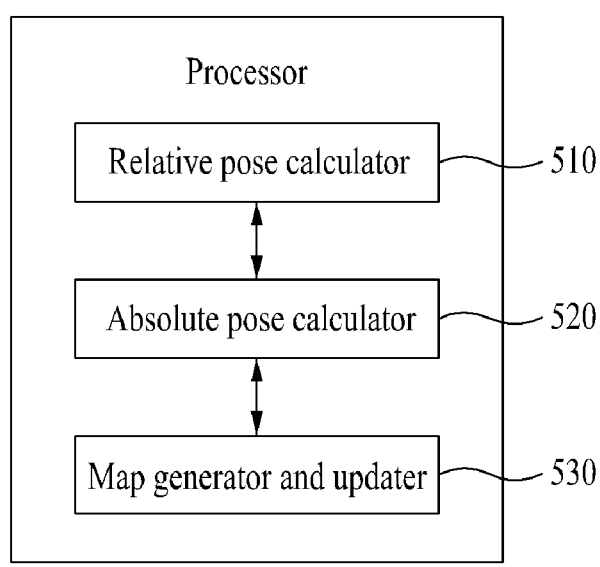
FIG. 5 illustrates an example of a component includable in a processor of a server according to an example embodiment.
Figure 6:
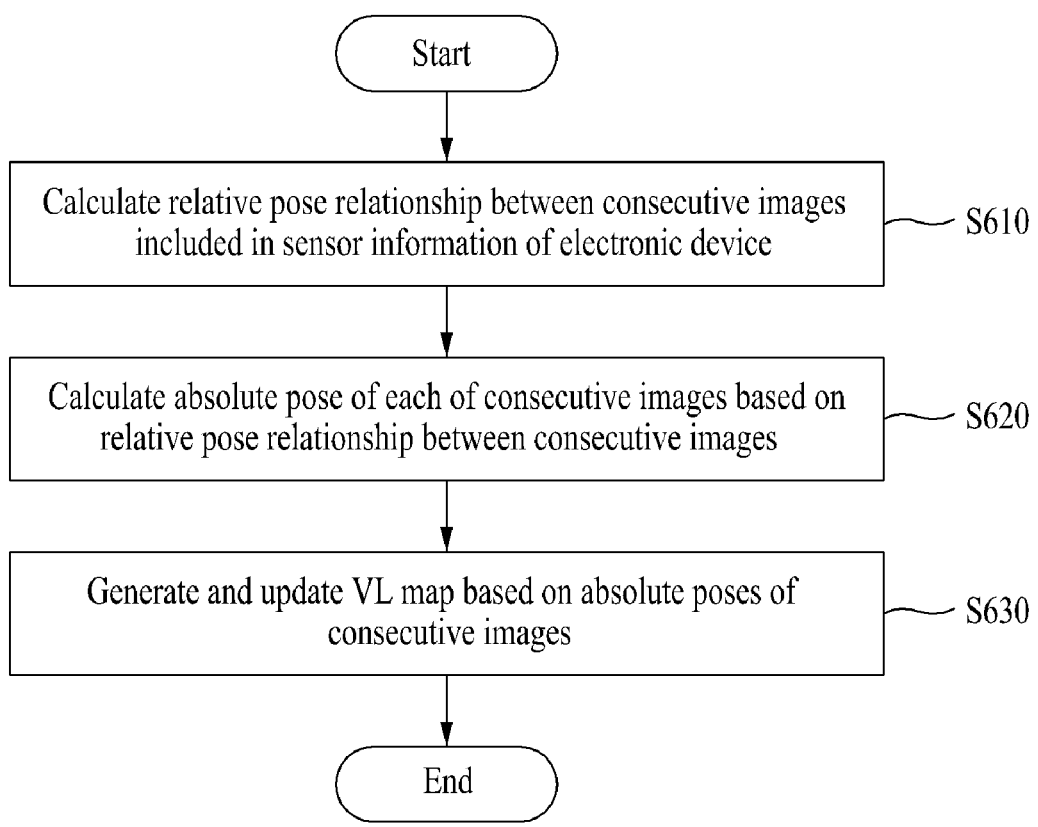
FIG. 6 is a flowchart illustrating an example of a method performed by a server according to an example embodiment.

FIG. 5 illustrates an example of a component includable in the processor 222 of the server 150 according to an example embodiment, and FIG. 6 is a flowchart illustrating an example of a method performed by the server 150 according to an example embodiment.

The server 150 according to an example embodiment may provide a VL based service as an example of a location based service, and particularly, may serve as a cloud server to update a VL map based on crowdsourcing.

Referring to FIG. 5, the processor 222 of the server 150 may include a relative pose calculator 510, an absolute pose calculator 520, and a map generator and updater 530 as components to perform a map update method of FIG. 6. Depending on example embodiments, the components of the processor 222 may be selectively included in or excluded from the processor 222. Also, the components of the processor 222 may be separated or merged for functional representation of the processor 222.

The processor 222 and the components of the processor 222 may control the server 150 to perform operations S610 to S630 included in the map update method of FIG. 6. For example, the processor 222 and the components of the processor 222 may be configured to execute an instruction according to a code of at least one program and a code of an OS included in the memory 221.

Here, the components of the processor 222 may be representations of different functions of the processor 222 performed by the processor 222 in response to an instruction provided from a program code stored in the server 150. For example, the relative pose calculator 510 may be used as a functional representation of the processor 222 to control the server 150 to calculate a relative pose relationship in response to the instruction.

The processor 222 may read necessary instructions from the memory 221 to which instructions associated with the control of the server 150 are loaded. In this case, the read instruction may include an instruction to control the processor 222 to perform the following operations S610 to S630.

Referring to FIG. 6, in operation S610, the relative pose calculator 510 may receive consecutive sensor information as query information occurring during a service use from the electronic device 110 of the user using a VL based service, and may calculate a relative pose relationship between consecutive images included in the sensor information. The sensor information may include data acquirable from various types of sensors, for example, an image sensor, an inertial measurement unit (IMU), a wheel encoder, wireless fidelity (WiFi), Bluetooth, a global positioning system (GPS), and the like. The electronic device 110 may directly calculate primary geographical information (descriptor, dots, lines, etc.) of a target space and may upload the calculated geographical information to the server 150. Here, the relative pose calculator 510 may calculate an appropriate pose relationship between consecutive images received from the electronic device 110 through various sensors. Here, such a relative pose calculation may use, for example, a visual odometry (VO) method, a visual-inertial odometry (VIO) method, etc., such as a visual-inertial system (VINS).

To calculate the relative pose relationship, the relative pose calculator 510 may extract a feature from an image using a feature extraction algorithm, for example, scale invariant feature transform (SIFT), speeded up robust features (SURF), features from accelerated segment test (FAST), binary robust independent elementary features (BRIEF), oriented FAST and Rotated BRIEF (ORB), and the like.

Figure 7:
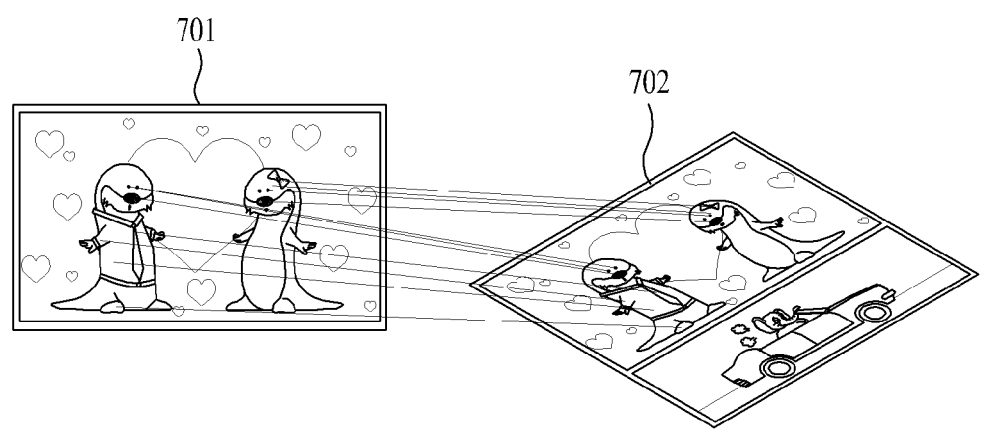
FIG. 7 illustrates an example of a process of acquiring correspondences between images according to an example embodiment.

The relative pose calculator 510 may acquire correspondences of features between different images based on descriptor information of the features extracted from the images. Referring to FIG. 7, the relative pose calculator 510 may acquire correspondences between different two images, that is, a first image 701 and a second image 702, from a result of matching features of the first image 701 and the second image 702.

A projection error may be defined by following Equation 1, based on the acquired correspondences between the different images.

$$r(x) = \pi(T^t X) - x_t \quad \text{[Equation 1]}$$

In Equation 1, $\pi$ denotes a projection function, $T^t$ denotes a 4×4 transformation matrix representing a 6DoF pose, X denotes a 3D point of a reference image feature, and $x_t$ denotes two-dimensional (2D) pixel coordinates of a query image feature.

Adding up errors with respect to all of the correspondences, an energy function E in a form of Equation 2 may be acquired.

$$E(\cdot) = \sum_{k \in \Omega} r(x_k, T^t)^2 = \sum_k (\pi(T^t X) - x_k)^2 = 0 \quad \text{[Equation 2]}$$

A transformation matrix $T^t$ may be calculated such that the energy function E may be minimized. Here, a screw displacement method represented by following Equation 3 may be used to calculate the transformation matrix $T^t$.

$$T = \begin{bmatrix} R & t \\ 0 & 1 \end{bmatrix} = \exp(\hat{\xi}) = \exp\left(\begin{bmatrix} 0 & -w_z & w_y & v_x \\ w_z & 0 & -w_x & v_y \\ -w_y & w_x & 0 & v_z \\ 0 & 0 & 0 & 0 \end{bmatrix}\right) \quad \text{[Equation 3]}$$

-continued
$$(\xi = [w_x, w_y, w_z, v_x, v_y, v_z]^T)$$

In Equation 3, R denotes a rotation matrix, t denotes a translation vector, $\xi$ denotes a twist vector, each of $w_x$, $w_y$, and $w_z$ denotes a rotation velocity of each corresponding axis, and each of $v_x$, $v_y$, and $v_z$ denotes a translation velocity of each corresponding axis.

Accordingly, the energy function E may be linearized as represented by following Equation 4 through a first-order Talyor series approximation method and a chain rule. Here, a recursive twist vector value $\xi$ may be calculated using a decomposition method.

$$E(\xi) \simeq \sum_k \left[ x_0 - x_k + \left( \frac{d\pi(X)}{dX} \frac{dX}{dT} M \right) \xi \right]^2 = 0 \quad \text{[Equation 4]}$$

In Equation 4, M denotes a mapping matrix for transformation between the transformation matrix T and the twist vector $\xi$.

The relative pose calculator 510 may calculate a relative pose between consecutive images based on correspondences of features acquired between different images through the aforementioned process.

Referring again to FIG. 6, in operation S620, the absolute pose calculator 520 may calculate an absolute pose of each of consecutive images based on a point that connects to an existing map. Here, the absolute pose calculator 520 may calculate an absolute pose of each image based on a relative pose relationship between the consecutive images.

Based on a point at which calculation of the absolute pose is a success on the existing VL map among images received from the electronic device 110, the absolute pose calculator 520 may calculate absolute poses of remaining images corresponding to a calculation failure using the relative pose relationship calculated in operation S610.

Figure 8:
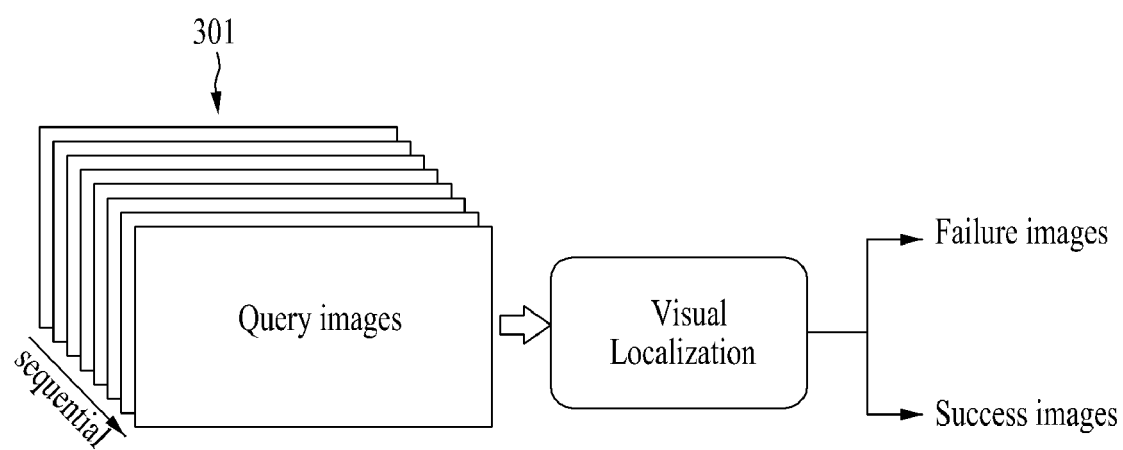
FIG. 8 illustrates an example of a process of calculating an absolute pose of an image according to an example embodiment.

Referring to FIG. 8, the absolute pose calculator 520 attempts an absolute pose calculation by using each image received as the consecutive query images 301 as an input for VL and then determines whether calculation of an absolute pose is a failure for each image. The absolute pose calculation is performed through the VL process described above with reference to FIGS. 3 and 4. That is, the absolute pose calculator 520 may extract a feature of the query image 301, may search a VL map database for a reference image similar to the query image 301 using the extracted feature, and may estimate an absolute pose on a VL map for the query image 301 through a localization using the retrieved reference image and the query image 301.

The absolute pose calculator 520 may estimate poses of images (failure images) corresponding to a calculation failure through a graph-based pose optimization using the absolute pose acquired through the aforementioned process and the relative pose acquired in operation S610.

Figure 9:
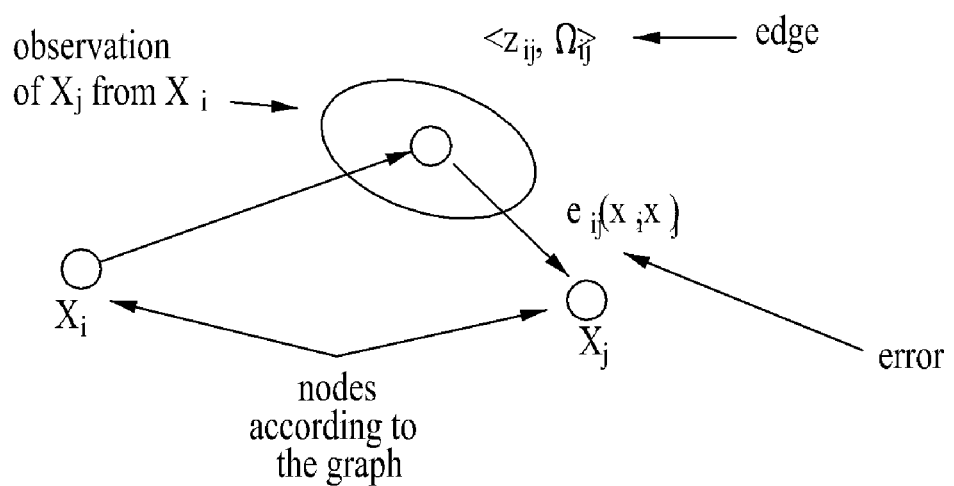
FIGS. 9 to 11 illustrate examples of a graph-based pose optimization process according to an example embodiment.

Referring to FIG. 9, a pose of each of images may be defined as a node $x_i$ of a graph and an edge $<z_{ij}, \Omega_{ij}>$ between consecutive image nodes ($x_i$, $x_j$) may be defined using a relative pose value $z_{ij}$. Here, $\Omega_{ij}$ denotes a covariance of the relative pose value $z_{ij}$. An error $e_{ij}$ may be defined as Equation 5 using the relative pose value $z_{ij}$ and a pose difference $x_i^{-1} \times x_j$ between actual nodes.

$$e(x_i, x_j, z_{ij}) = t2v(z_{ij}^{-1} \times x_j)) \quad \text{[Equation 5]}$$

In Equation 5, t2v denotes a function that transforms a transformation matrix to a vector of 1×6. In general, the screw displacement method may be used.

The absolute pose calculator 520 may define an image node using poses of consecutive images acquired through a VO method or a VIO method, and may define between the image nodes as an edge using a relative pose value. The absolute pose calculator 520 may define a node of which absolute pose calculation through VL is a success and may define an additional edge based on an image node at a point in time at which the absolute pose calculation is a success and an identity pose relationship.

Defining all of the graph structures, a pose-graph error function $f(\cdot)$ may be defined as represented by following Equation 6 with respect to all of the edges.

$$f(\cdot) = \Sigma_k e_k^T \Omega_k e_k \qquad \text{[Equation 6]}$$

The absolute pose calculator 520 may recursively estimate a pose value x* of a node using a Gauss-Newtopn method to minimize an error as represented by following Equation 7.

$$x^* = \Sigma \text{argmin}_x \Sigma_k e_k^T \Omega_k e_k \qquad \text{[Equation 7]}$$

Referring again to FIG. 6, in operation S630, the map generator and updater 530 may generate and update a VL map based on the absolute poses of the consecutive images.

The map generator and updater 530 may generate the map for VL and may update the existing map using the absolute poses of the images calculated in operation S620. Here, the map update may be performed by additionally inserting, into the existing map, information, for example, an image descriptor, a feature extracted from an image, a descriptor of the feature, and a 3D point of the feature, required for a pose estimation.

That is, the map generator and updater 530 may generate and update the VL map based on the graph structure described with reference to FIG. 9.

Figure 10:
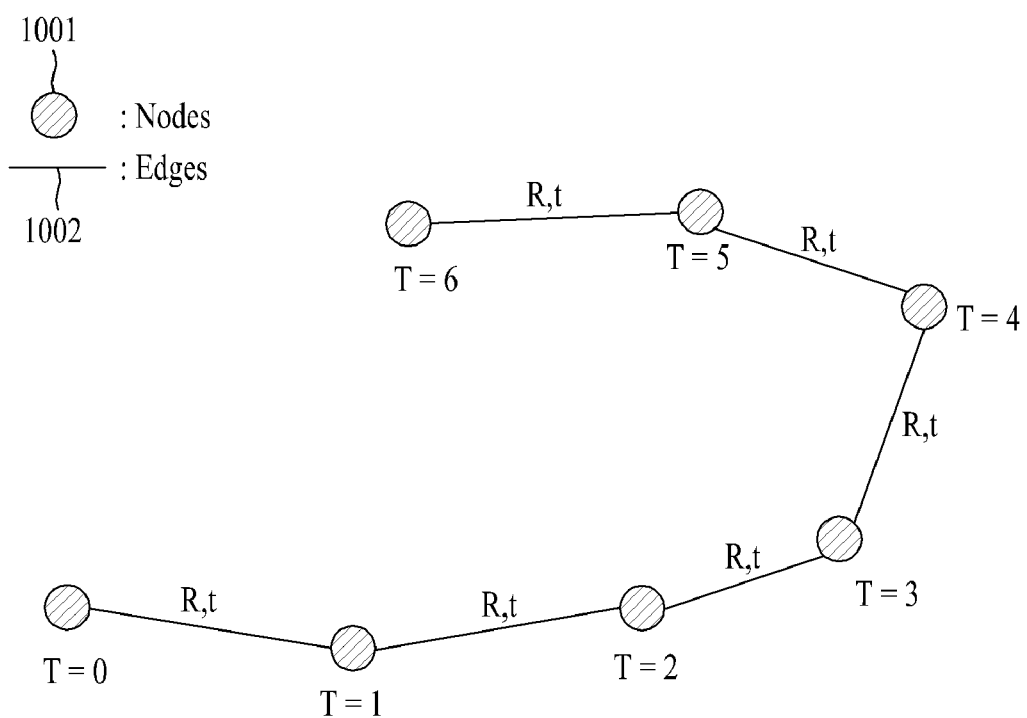

Referring to FIG. 10, the absolute pose calculator 520 may generate a graph structure by defining, as a node 1001, a point at which a pose of each image acquired through a VO method or a VIO method is captured. That is, each image is captured with respect to consecutive query images received at points in times T=0, T=1, T=2, T=3, T=4, T=5, and T=6, and by defining, as an edge 1002, a pose difference (R,t) with an image captured at a previous point in time.

Figure 11:
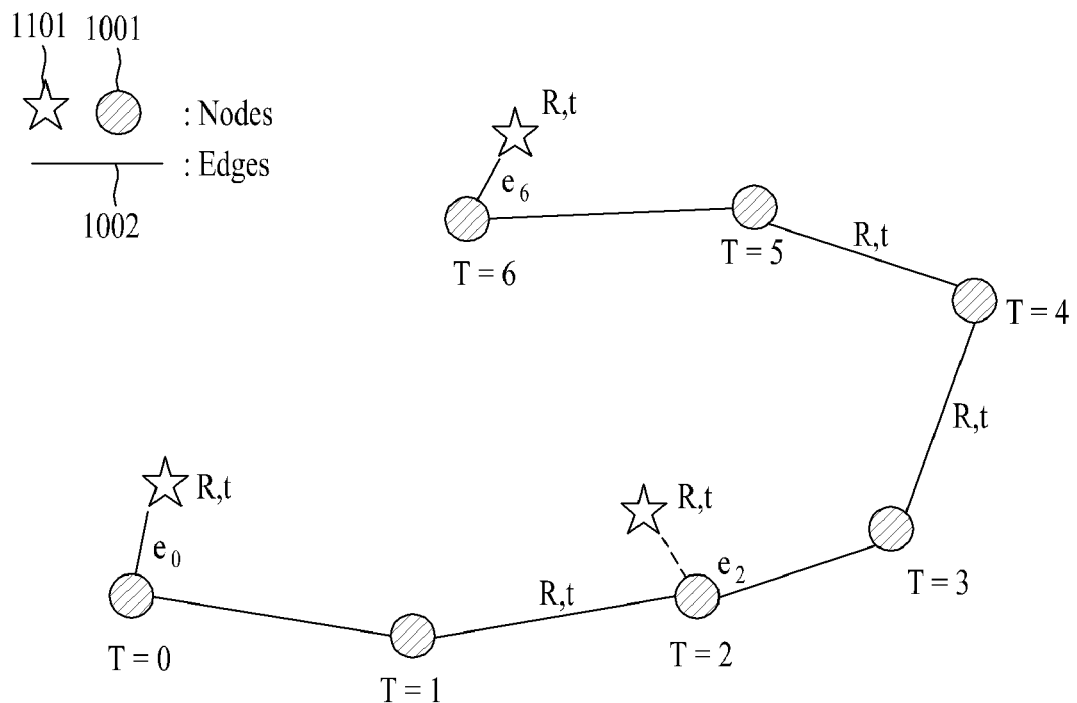

Referring to FIG. 11, the absolute pose calculator 520 may additionally define nodes 1101 (corresponding to points in times T=0, T=2, and T=6) each of which absolute pose calculation through VL is a success among the image nodes 1101 and then may estimate absolute poses of remaining nodes (corresponding to points in times T=1, T=3, T=4, and T=5) to minimize an error between the absolute poses and the relative poses of the nodes (corresponding to points in times T=0, T=2, and T=6) of which absolute pose calculation is a success.

The map generator and updater 530 may update a VL map by adding images (failure images) of which absolute pose calculation through VL is a failure, that is, images of which poses are estimated through a graph-based pose optimization as a reference image of a corresponding point.

Accordingly, the server 150 may calculate a relative pose between consecutive images using a VO method or a VIO method and may update the VL map using the calculated relative pose, and may calculate a pose of the electronic device 110 on the updated VL map.

According to example embodiments, to seamlessly provide a VL based service, it is possible to maintain a VL map up to date, that is, update the VL map based on crowdsourcing and accordingly, to provide the VL based service robust and stable for a spatial/state change of a target space. Technology for updating a VL map using a crowdsourcing based image may be further efficient and permanent compared to an existing method of performing scanning using data collection equipment and then updating a VL map every time a change occurs in a target space.

The systems and/or apparatuses described herein may be implemented using hardware components, software components, and/or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments, or vice versa.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A map updating method implemented by a computer system having at least one processor configured to execute computer-readable instructions stored in a memory, the method comprising:
   receiving consecutive images from an electronic device as query information;
   extracting a feature from each of the consecutive images received from the electronic device;
   calculating a relative pose relationship between the consecutive images using correspondences of features extracted from the consecutive images;
   calculating an absolute pose of each image of the consecutive images based on the relative pose relationship between the consecutive images; and
   updating a map used for visual localization (VL) based on the absolute pose;
   wherein the calculating of the absolute pose comprise,
   determining whether calculation of the absolute pose of each image is a failure by extracting a feature of a query image corresponding each image, searching a visual localization map database for a reference image similar to the query image using the extracted features of the query image, and estimating an absolute pose on a visual localization map for each image through localization using the retrieved reference image and the query image; and
   estimating the absolute pose of a remaining image corresponding to a calculation failure using the absolute pose of an image corresponding to a calculation success among the consecutive images and the relative pose relationship between the consecutive images.

2. The method of claim 1, wherein the query information is generated in the electronic device using a VL based service.

3. The method of claim 1, wherein the estimating of the absolute pose of the remaining image comprises estimating the absolute pose of the remaining image corresponding to the calculation failure through a graph structure that is defined based on the absolute pose of the image corresponding to the calculation success and the relative pose relationship between the consecutive images.

4. The method of claim 1, wherein the estimating of the absolute pose of the remaining image comprises:
   generating a graph structure in which a pose of each image is defined as a node and a pose difference between images is defined as an edge with respect to the consecutive images;
   defining the absolute pose of the image corresponding to the calculation success among the consecutive images as an additional node in the graph structure; and
   estimating the absolute pose of an image corresponding to a remaining node using a method of minimizing an error between the node and the additional node.

5. The method of claim 1, wherein the updating of the map comprises adding an image of which the absolute pose is estimated among the consecutive images as a reference image for VL.

6. A non-transitory computer-readable recording medium storing computer instructions that, when executed by a processor, cause the processor to perform the map updating method of claim 1.

7. A computer system comprising:
   at least one processor configured to execute computer-readable instructions stored in a memory,
   wherein the at least one processor comprises:
   a relative pose calculator configured to receive consecutive images from an electronic device as query information, extract a feature from each of the consecutive images received from the electronic device, and calculate a relative pose relationship between the consecutive images using correspondences of features extracted from the consecutive images;
   an absolute pose calculator configured to calculate an absolute pose of each image of the consecutive images based on the relative pose relationship between the consecutive images; and
   a map updater configured to update a map used for visual localization (VL) based on the absolute pose,
   wherein the calculating of the absolute pose comprise,
   determining whether calculation of the absolute pose of each image is a failure by extracting a feature of a query image corresponding each image, searching a visual localization map database for a reference image similar to the query image using the extracted features of the query image, and estimating an absolute pose on a visual localization map for each image through localization using the retrieved reference image and the query image; and
   estimating the absolute pose of a remaining image corresponding to a calculation failure using the absolute pose of an image corresponding to a calculation success among the consecutive images and the relative pose relationship between the consecutive images.

8. The computer system of claim 7, wherein the query information is generated in the electronic device using a VL based service.

9. The computer system of claim 7, wherein the absolute pose calculator is further configured to estimate the absolute pose of the remaining image corresponding to the calculation failure through a graph structure that is defined based on the absolute pose of the image corresponding to the calculation success and the relative pose relationship between the consecutive images.

10. The computer system of claim 7, wherein the absolute pose calculator is further configured to
   generate a graph structure that in which a pose of each image is defined as a node and a pose difference between images is defined as an edge with respect to the consecutive images,
   define the absolute pose of the image corresponding to the calculation success among the consecutive images as an additional node in the graph structure, and
   estimate the absolute pose of an image corresponding to a remaining node using a method of minimizing an error between the node and the additional node.

11. The computer system of claim 7, wherein the map updater is further configured to update the map by adding an image of which the absolute pose is estimated among the consecutive images as a reference image for VL.

\* \* \* \* \*